May 9, 1950  G. J. SIEZEN  2,507,226
CIRCUIT ARRANGEMENT FOR CHARGING OR
DISCHARGING CONDENSERS
Filed May 5, 1947  2 Sheets-Sheet 2

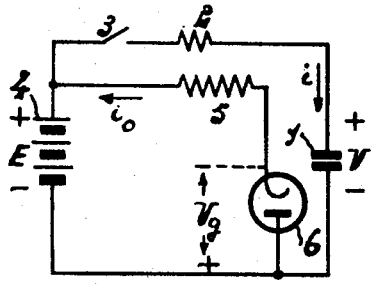
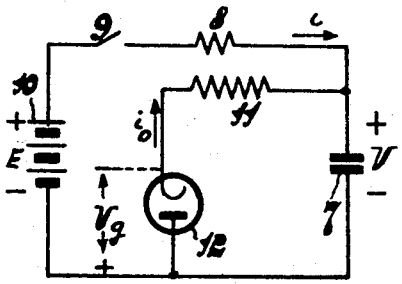
Fig. 1
Fig. 3
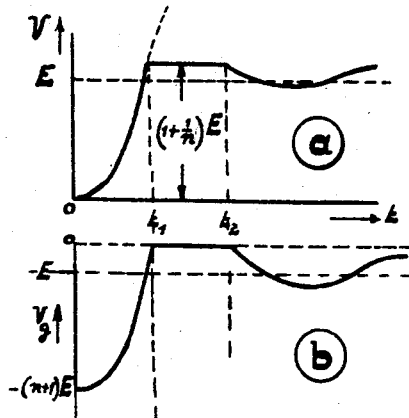
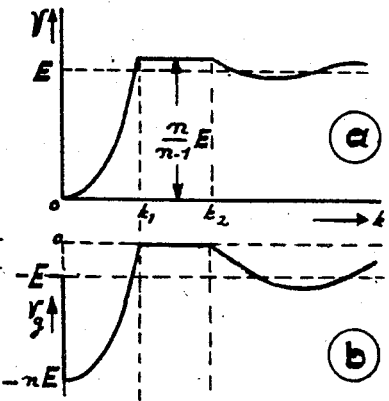
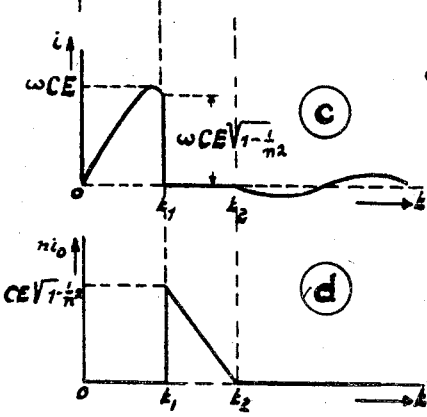
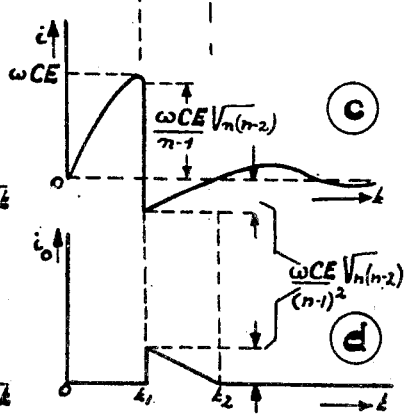
Fig. 2
Fig. 4

G. JAN SIEZEN
INVENTOR

BY *Lee B. Kenon.*
ATTORNEY

Patented May 9, 1950

2,507,226

UNITED STATES PATENT OFFICE 2,507,226

CIRCUIT ARRANGEMENT FOR CHARGING OR DISCHARGING CONDENSERS

Gerrit Jan Siezen, Eindhoven, Netherlands, assignor to Hartford National Bank and Trust Company, Hartford, Conn., as trustee Application May 5, 1947, Serial No. 745,964
In the Netherlands June 17, 1946

4 Claims. (Cl. 320—1)

It is well-known that consequent on charging or discharging a condenser much energy is generally wasted. If, for example, a condenser having a capacity C is charged with the aid of a direct current source having an output voltage E, the source of voltage and the condenser having connected in between them any conductive circuit-element, for example, a resistance, the electrostatic energy accumulated in the condenser upon termination of the charging process is ½ $CE^2$. However, during the charging process the source of voltage has supplied a total energy of $CE^2$, so that an amount of energy of ½ $CE^2$ is wasted. In this connection it is mentioned that this amount of dissipated energy is independent of the nature of the circuit element.

The invention has for its object to provide a method of charging or discharging a condenser, in which dissipation of energy is greatly reduced.

The method according to the invention is characterized in that charging or discharging is effected for a quarter period of the natural oscillation set up in the series combination of the condenser and an inductance coil included in the charging or discharging circuit and in that the energy accumulated in the inductance coil is then supplied to an energy accumulator.

As will be set out more fully hereinafter, a considerable part of the energy, which is otherwise lost, for example, in the form of heat in a resistance, is recovered by the use of the said method.

In order that the invention may be more clearly understood and carried into effect, it will now be described more fully with reference to the accompanying drawing, in which a number of embodiments of circuit-arrangements for carrying out the method according to the invention are illustrated.

Figure 1 is a schematic diagram showing one embodiment of the invention;

Fig. 2 is a graphical representation of currents and voltages existing in the circuit shown in Fig. 1;

Fig. 3 is a schematic diagram showing a further embodiment of the invention;

Fig. 4 is a graphical representation of the currents and voltages existent in the circuit shown in Fig. 3;

Figure 5:
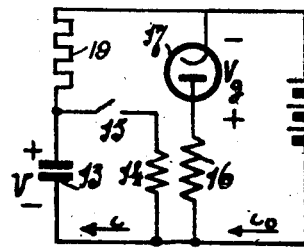
Fig. 5 is an embodiment of the invention showing the operation of the circuit for discharge.

Fig. 1 shows a circuit-arrangement for charging a condenser 1 having a capacity C, which is connected in series with a coil 2 having an inductance L, a switch 3 and a battery 4 having an output voltage E. Connected to this battery is also a circuit which comprises the series combination of a second coil 5 having an inductance $n^2L$ ($n>1$) and a rectifier 6. The currents, if any, passing through these circuits when the switch 3 is closed are designated $i$ and $i_0$ respectively. The voltages are taken as positive, if their polarity corresponds to that shown in the figure.

The sense in which coil 5 is wound is such that immediately on closing switch 3 the voltage $V_g$ across the rectifier 6 is negative, so that initially $i_0=0$. Between the current $i$ and the voltage $V$ across the condenser there is the relation:

$$i = c\frac{dV}{dt}$$

so that $$V + L\frac{di}{dt} = V + LC\frac{d^2V}{dt^2} = E$$

It follows, if regard is had to the initial conditions, that for the time $t=0$ V and $i$ are also zero, that $$V = E(1-\cos \omega t) \qquad (1)$$

in which $$\omega = \frac{1}{\sqrt{LC}}$$

If the leakage inductance and the resistance of the transformer formed by coils 2 and 5 are negligible and if the coefficient of reciprocal inductance is $M=-nL$, the following relation also applies:

$$V_g = -E - nL\frac{di}{dt} = -(n+1)E + nV$$

Thus, voltage V will increase in accordance with Formula 1 until $V_g$ attains the value zero. This occurs for $t=t_1$, $t_1$ being determined by $$V = \frac{n+1}{n}E = E(1-\cos \omega t_1)$$

or $$\cos \omega t_1 = -\frac{1}{n} \qquad (2)$$

The value which V attains is consequently equal to $$\frac{n+1}{n}E$$

so that in the case of a high $n$ the voltage exceeds the desired voltage E to a small extent only. This desired voltage was already attained before $t=t_1$ at the end of the first quarter period of the oscillation set up.

As soon as $$V = \frac{n+1}{n}$$

the rectifier becomes conductive. For the sake of simplicity it is assumed that during the passage of the current $i_0$ through the rectifier the voltage $V_g$ remains zero, which will be the case if the resistance of the rectifier is negligible. In this case the following relations apply:

$$E = L\frac{di}{dt} + nL\frac{di_0}{dt} + V$$

and $$E = -nL\frac{di}{dt} - n^2L\frac{di_0}{dt}$$

It follows that $(n+1)E = nV$, so that $$i = C\frac{dV}{dt} = 0$$

whilst at the same time $$\frac{di_0}{dt} = -\frac{E}{n^2L}$$

Thus $$i_0 - i_0(t_1) = -\frac{E}{n^2L} t \quad (3)$$

in which $i_0(t_1)$ designates the current $i_0$ at the moment of time $t_1$.

The value of $i_0(t_1)$ follows from the continuity of the magnetic energy accumulated in the transformer as a function of time:

$$\tfrac{1}{2} Li^2(t_1) = \tfrac{1}{2} n^2 L i_0^2(t_1)$$

and hence $$ni_0(t_1) = i(t_1)$$

As far as $t_1$ we have according to (1) $V = E(1-\cos \omega t)$ hence $$i = \omega CE \sin \omega t$$

and from this together with (2) follows:

$$i(t_1) = ni_0(t_1) = \omega CE\sqrt{1-\frac{1}{n^2}}$$

and this, combined with (3):

$$ni_0 = \omega CE\sqrt{1-\frac{1}{n^2}} - \frac{E}{n^2L} t$$

The current $i_0$ is zero from the moment of time $t=0$, at which the switch 3 is closed, to $t=t_1$ at which $ni_0$ abruptly jumps to the value $$\omega CE\sqrt{1-\frac{1}{n^2}}$$

after which it decreases linearly until the value zero is attained at the moment of time $t_2$.

The rectifier 6 then again becomes non-conductive and the excess of accumulated energy in the condenser will oscillate out with an initial amplitude of $$\frac{E}{n}$$

about the desired value E. If $n$ is high, the energy thus lost is only a very small fraction of the energy accumulated in the condenser.

In Figs. 2a, 2b, 2c and 2d is plotted the variation of the values V, $V_g$, $i$ and $ni_0$ respectively as a function of time, said variation being obvious with reference to the above calculation.

Fig. 2a shows that the condenser is charged up to the voltage E for a quarter period of the natural oscillation which is set up in the circuit of condenser 1 and coil 2 after switching on and that feeding back of the energy accumulated in the coil then starts at the moment of time $t_1$. The quantity of fed back energy is $$E\int_{t_1}^{t_2} i_0 dt = \frac{1}{2n} \omega CE^2 (t_2-t_1)\sqrt{1-\frac{1}{n^2}}$$

from which, together with $$t_2 - t_1 = nL\omega C\sqrt{1-\frac{1}{n^2}}$$

follows an amount $$\tfrac{1}{2} CE^2 \left(1 - \frac{1}{n^2}\right)$$

which is increased as $n$ is made smaller.

Fig. 3 shows a further circuit-arrangement for charging a condenser.

In this case the condenser 7 is also connected in series with a coil 8, a switch 9 and a source of direct current 10. The series combination of a coil 11 and a rectifier 12 is connected in parallel with the condenser, the sense of winding of the coil again being such that initially after switching on the charging circuit the rectifier has no current $i_0$ passing through it. The coil 8 exhibits an inductance L and the coil 11 an inductance $n^2L(n>1)$, the coefficient of reciprocal inductance being $M=-nL$.

A calculation similar to that for the circuit-arrangement of Fig. 1 again permits of the variations of the condenser voltage V, the voltage across the rectifier $V_g$, the current $i$ in the condenser circuit and the current $i_0$ in the rectifier circuit being calculated as a function of time. These variations are illustrated in Figs. 4a, 4b, 4c and 4d respectively. Fig. 4a shows that the condenser is charged in the first quarter period of the natural oscillation set up in the series combination of condenser 7 and coil 8 and that at the moment of time $t_1$ feeding back of the energy is then started.

As shown by the circuit-arrangement and also by Figs. 4c and 4d, during the feed back of the energy, from $t_1$ to $t_2$, the current $i_0$ passes through both coils 8 and 11.

The energy fed back to the battery 10 in this circuit-arrangement is found to be equal to $$\frac{CE^2}{2\left(1-\frac{1}{n}\right)^2}$$

an amount which consequently also increases as $n$ is increased.

At the moment of time $t_2$ the rectifier 12 again becomes non-conductive and the circuit 7, 8 oscillates out with an initial amplitude of $$\frac{1}{n-1}$$

about the ultimate value $-E$, little energy again being lost, if $n$ is large.

Fig. 5 shows a circuit-arrangement which permits of feeding back to a battery substantially entirely the energy released on the discharge of a condenser by short-circuiting.

In this case a condenser 13 exhibiting a capacity C is connected in series with a coil 14 exhibiting an inductance L, and a switch 15. Condenser 13 is charged from a direct current source 18 through a resistor 19. There is also a circuit constituted by the series combination of a coil 16 having an inductance $n^2L$ ($n>1$), a rectifier 17 and direct current source 18 having an output voltage E. The lower ends of coil 14 and coil 16 are connected together. The coil 16 is wound in such manner that after switch 15 is closed the rectifier has initially no current passing through it. In this case the coefficient of reciprocal inductance of the coils 14 and 16 is $M=-nL$. The voltage across the condenser decreases from the initial value $V=+E$ at the moment of time $t=0$ until $t=t_1$ according to $V=E \cos \omega t$ with $$\omega = \frac{1}{\sqrt{LC}}$$

At $t=t_1$, when $$V = -\frac{E}{n}$$

the rectifier becomes conductive, after which $$V = -\frac{E}{n}$$

remains constant, whereas $i$ becomes zero. Energy is then fed back to the battery during the interval $t_1 < t < t_2$.

By way of further illustration of the operation of the circuit-arrangement, Figs. 6a, 6b, 6c and 6d show the variations of the condenser voltage V, of the voltage $V_g$ across the rectifier, the current $i$ in the discharge circuit and the current $i_0$ multiplied by $n$ passing through the rectifier as a function of time.

Figure 7:
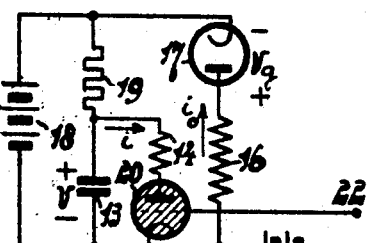
Fig. 7 is a circuit diagram showing a further embodiment of the invention.
Figure 6:
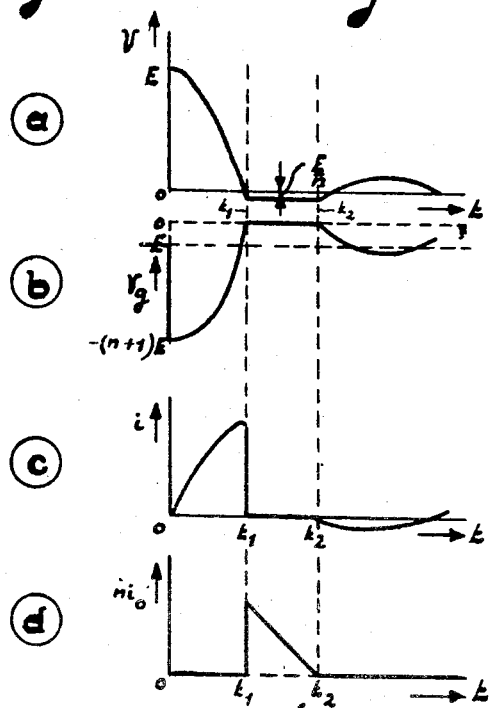
Fig. 6 is a graphical representation of the current and voltages existent in the circuit shown in Fig. 5.

A circuit-arrangement of the type shown in Fig. 5 permits of materially increasing the efficiency of a time base generator. A circuit-arrangement for this purpose is shown in Fig. 7, in which those parts which are similar to those of Fig. 5 have equal reference numerals, a gasfilled triode 20 being, however, substituted for the switch 15 of Fig. 5. A properly chosen control-voltage may be fed to the control grid of this tube via terminals 22 and 23 from a bias voltage source 21, but in the circuit-arrangement described hereinafter use is not made of a control-voltage and the tube 20 becomes conductive as soon as a given anode voltage is attained.

The energy released on the discharge of condenser 13 is supplied to the battery 18. This battery now also ensures, via a resistance 19 having a value R, that the condenser is charged.

If the condenser is charged through the resistance 19 up to a voltage $V_b$, at which tube 20 ignited, the electrostatic energy accumulated in the condenser first passes into coil 14, so that the voltage V across the condenser falls to a value which is approximately equal to the arc voltage of tube 20, whereas the current $i$ is increased to a maximum value which is approximately equal to $\omega CV_b$, if $$\omega = \frac{1}{\sqrt{LC}}$$

The rectifying tube 17 then becomes conductive and the value of the current $i$ abruptly jumps to zero, so that the gasfilled triode 20 is extinguished. The energy accumulated in the transformer at that moment of time, which energy is approximately equal to $\frac{1}{2}CV_b^2$ is then substantially entirely fed back to the battery through the diode 17.

Beyond a lower energy consumption this circuit-arrangement has the advantage that the moment of time at which the gas-filled triode is extinguished is very sharply defined as against the moment of time at which ignition takes place, which is very important, for example if used in circuit-arrangements for television purposes.

The fly-back time of the saw-tooth voltage set up across the condenser is limited by the maximum permissible current strength $i_m$ through the gasfilled triode 20. In the present case, the fly-back time T is equal to one quarter of the period of the natural oscillation of the LC-circuit 13, 14; consequently $$T = \frac{\pi}{2}\sqrt{LC} = \frac{\pi}{2\omega}$$

The maximum current $i_m$ becomes, as already indicated above, $i_m = \omega CV_b$ so that $$T = \frac{\pi}{2}\frac{CV_b}{i_m} = 1.57\frac{CV_b}{i_m}$$

If a condenser having a capacity C is discharged through a resistance $R_0$, the fly-back time will be at least twice the time constant $R_0C$, consequently
$T \geq 2R_0C$ and since in this case $$i_m = \frac{V_b}{R_0}, \quad T \geq 2\frac{CV_b}{i_m}$$

At the same values for $i_m$, C and $V_b$ the circuit-arrangement shown in Fig. 7 consequently also exhibits the advantage of a smaller fly-back time.

What I claim is:

1. A circuit arrangement for producing charge variations in a condenser, comprising in series circuit arrangement a switch member, said condenser and an inductor, a source of direct current, means to couple said series circuit to said source, a unidirectional conductor poled in opposition to said source, and an inductive element magnetically linked to said inductor and connected in series with the said unidirectional conductor and said current source.

2. A circuit arrangement for producing charge variations in a condenser, comprising a source of direct current, a first series circuit connected in shunt with said source and comprising a first inductive element, said condenser and switching means to produce current flow through said condenser and said inductance element, and a second series circuit connected in shunt with said source and comprising a rectifier poled in opposition to said source and a second inductive element magnetically linked to said first inductive element.

3. A circuit arrangement for producing charge variations in a condenser, comprising a direct current source, a first circuit comprising in series connection a first inductive element, said condenser and a gaseous discharge tube, means to couple said first circuit to said source, and a second circuit connected in shunt with said source and comprising in series connection a rectifier poled in opposition to said source and a second inductive element magnetically linked to said first inductive element.

4. A circuit arrangement for producing charge variations in a condenser, comprising a direct current source, a resistance element connecting said condenser to said source, a first circuit comprising in series connection a first inductive element, said condenser and a discharge tube having a control grid, and a second circuit connected in shunt with said source and comprising in series connection a rectifier poled in opposition to said source and a second inductive element magnetically linked to said first inductive element, said first and second inductive elements being so poled relative to each other that the polarity of the voltage initially induced in said second inductive element upon initial current flow through said first inductive element and said discharge tube is in opposition to the polarity of said rectifier.

GERRIT JAN SIEZEN.

REFERENCES CITED

The following references are of record in the file of this patent:

UNITED STATES PATENTS

| Number | Name | Date |
|---|---|---|
| 2,085,100 | Knowles et al. | June 29, 1937 |
| 2,400,113 | Haine | May 14, 1946 |